United States Patent [19]

Houseman et al.

[11] 3,955,941

[45] May 11, 1976

[54] HYDROGEN RICH GAS GENERATOR

[75] Inventors: John Houseman, Pasadena; Jack H. Rupe, Sunland; Raymond O. Kushida, Los Angeles, all of Calif.

[73] Assignee: California Institute of Technology, Pasadena, Calif.

[22] Filed: Feb. 10, 1975

[21] Appl. No.: 548,559

Related U.S. Application Data

[63] Continuation of Ser. No. 390,049, Aug. 20, 1973, abandoned.

[52] U.S. Cl. .................................. 48/95; 23/281; 48/215; 123/1 A; 123/3; 423/650
[51] Int. Cl.² ........................................... C10J 3/00
[58] Field of Search ............ 48/116, 117, 118, 61, 48/63, 95, 96; 23/281; 123/1 A, 3; 423/650

[56] References Cited
UNITED STATES PATENTS

| | | | |
|---|---|---|---|
| 2,051,363 | 8/1936 | Beekley | 423/650 |
| 2,268,910 | 1/1942 | Stryker | 23/281 |
| 2,681,273 | 6/1954 | Odell | 48/75 X |
| 2,789,094 | 4/1957 | Eastman et al. | 423/650 X |
| 3,682,142 | 8/1962 | Newkirk | 123/3 |
| 3,784,364 | 1/1974 | Slater et al. | 48/197 R |

FOREIGN PATENTS OR APPLICATIONS 111,497   1965   Netherlands.......................... 48/95

Primary Examiner—S. Leon Bashore
Assistant Examiner—George C. Yeung
Attorney, Agent, or Firm—Lindenberg, Freilich, Wasserman, Rosen & Fernandez

[57] ABSTRACT

A process and apparatus is described for producing a hydrogen rich gas by injecting air and hydrocarbon fuel at one end of a cylindrically shaped chamber to form a mixture, igniting the mixture to provide hot combustion gases, by partial oxidation of the hydrocarbon fuel. The combustion gases move away from the ignition region to another region where water is injected to be turned into steam by the hot combustion gases. The steam which is formed mixes with the hot gases present to yield a uniform hot gas whereby a steam reforming reaction with the hydrocarbon fuel takes place to produce a hydrogen rich gas.

13 Claims, 5 Drawing Figures

HYDROGEN RICH GAS GENERATOR

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

This is a continuation of application Ser. No. 390,049, filed on Aug. 20, 1973, now abandoned.

BACKGROUND OF THE INVENTION

1. Field of the Invention

This invention relates to hydrogen generators, and more particularly to improvements therein.

2. Description of the Prior Art

Because of the considerable amount of air pollution caused by operation of the automobile engine, a considerable amount of research has been undertaken to see if the internal combustion engine can be made pollutant free. One approach, which appears to be very promising, is to use a fuel consisting of a mixture of a hydrogen rich gas with the hydrocarbon fuel, such as gasoline, presently being used, and air, in proportions so that, the mixture, at most, is on the very lean side and yet is still flammable. The problem still exists, however, of providing a hydrogen generator that is sufficiently compact to be conveniently carried within a passenger automobile. The hydrogen generator must also be able to start generating hydrogen fast enough, when engine start up occurs, to provide quick, pollution free auto engine start up. Other requirements for a hydrogen generator of the type indicated are that it must have a long, trouble free lifetime, that it be safe and economical to operate.

OBJECTS AND SUMMARY OF THE INVENTION

An object of this invention is the provision of a novel and compact generator of a hydrogen rich gas.

Yet another object of this invention is the provision of a novel fast starting generator of hydrogen rich gas.

Still another object of this invention is the provision of a hydrogen rich gas generator that is safe and economical to operate.

These and other objects of the invention may be achieved in a system wherein hydrogen rich gas is generated in a cylindrically shaped chamber by injecting air and hydrocarbon fuel at one end of said chamber, igniting the mixture of said air and hydrocarbon fuel to provide very hot combustion gases, by partial oxidation of the hydrocarbon. These gases move away from said ignition region to another region where water is injected to be turned into steam by the hot combustion gases. Either simultaneously with the injection of water or subsequently thereto, more hydrocarbon fuel is injected. The steam which is formed mixes with the hot gases present to yield a uniform hot gas whereby a steam reforming reaction with the hydrocarbon fuel takes place to produce a hydrogen rich gas.

The novel features of the invention are set forth with particularity in the appended claims. The invention will best be understood from the following description when read in conjunction with the accompanying drawings.

BRIEF DESCRIPTION OF THE DRAWIMGS

DESCRIPTION OF THE PREFERRED EMBODIMENTS

Figure 1:
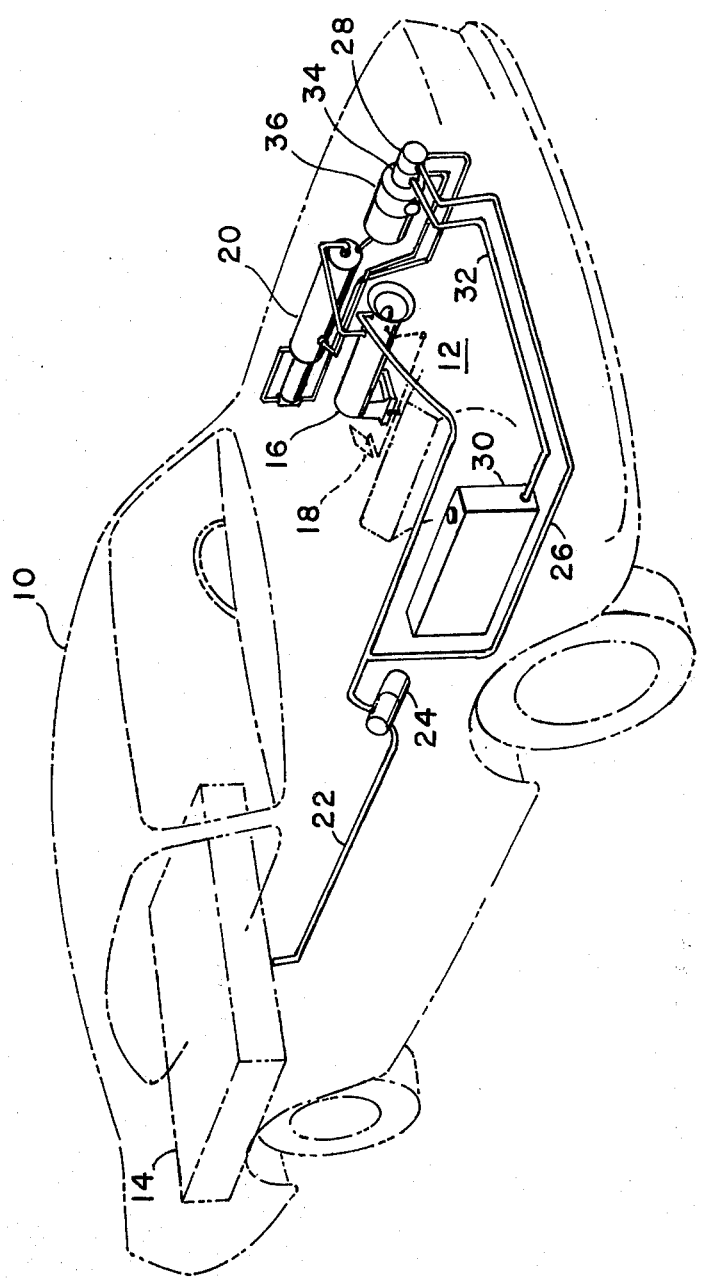
FIG. 1 is a schematic drawing of an automobile, illustrating placement of this invention and associated components therein.

FIG. 1 is the same as the FIG. 1 shown in an application for patent by J. Rupe entitled "System For Minimizing Internal Combustion Pollution Emission", (Attorney's Docket No. 73/259) which is assigned to a common assignee. FIG. 1 is shown to provide an appreciation of this invention. FIG. 1 shows an illustration of an automobile 10, having an engine 12, and a tank 14, in which the hydrocarbon fuel is kept. The engine is equipped with an induction tube 16, wherein there is located means for mixing air, hydrogen rich gas and hydrocarbon fuel in proportions which minimize the pollutant emission of the engine. A suitable arrangement for an induction tube including apparatus for mixing and controlling the mixture proportions is shown and described in an application for patent entitled, "System For Minimizing Internal Combustion Engine Pollution Emission" by Jack H. Rupe, Ser. No. 390,049, filed Aug. 20, 1973, which is assigned to a common assignee.

There is also provided an air throttle 18 which is controlled from the foot pedal, by the operator, and which determines the amount of air permitted to flow to the engine. Also, provided in accordance with this invention, is a hydrogen gas generator. The hydrocarbon fuel is fed into the mixing means in the induction tube through a pipe, 22, in which there is a fuel pump 24. Another pipe 26 branches from the pipe 22 to couple to a pump 28, which is used to supply hydrocarbon fuel to the hydrogen gas generator 20. A water supply 30 is provided. A pipe 32 couples the water supply to a pump 34 whereby water is provided to the hydrogen generator. An air pump 36, is also employed for applying air under pressure to the hydrogen generator.

Figure 2:
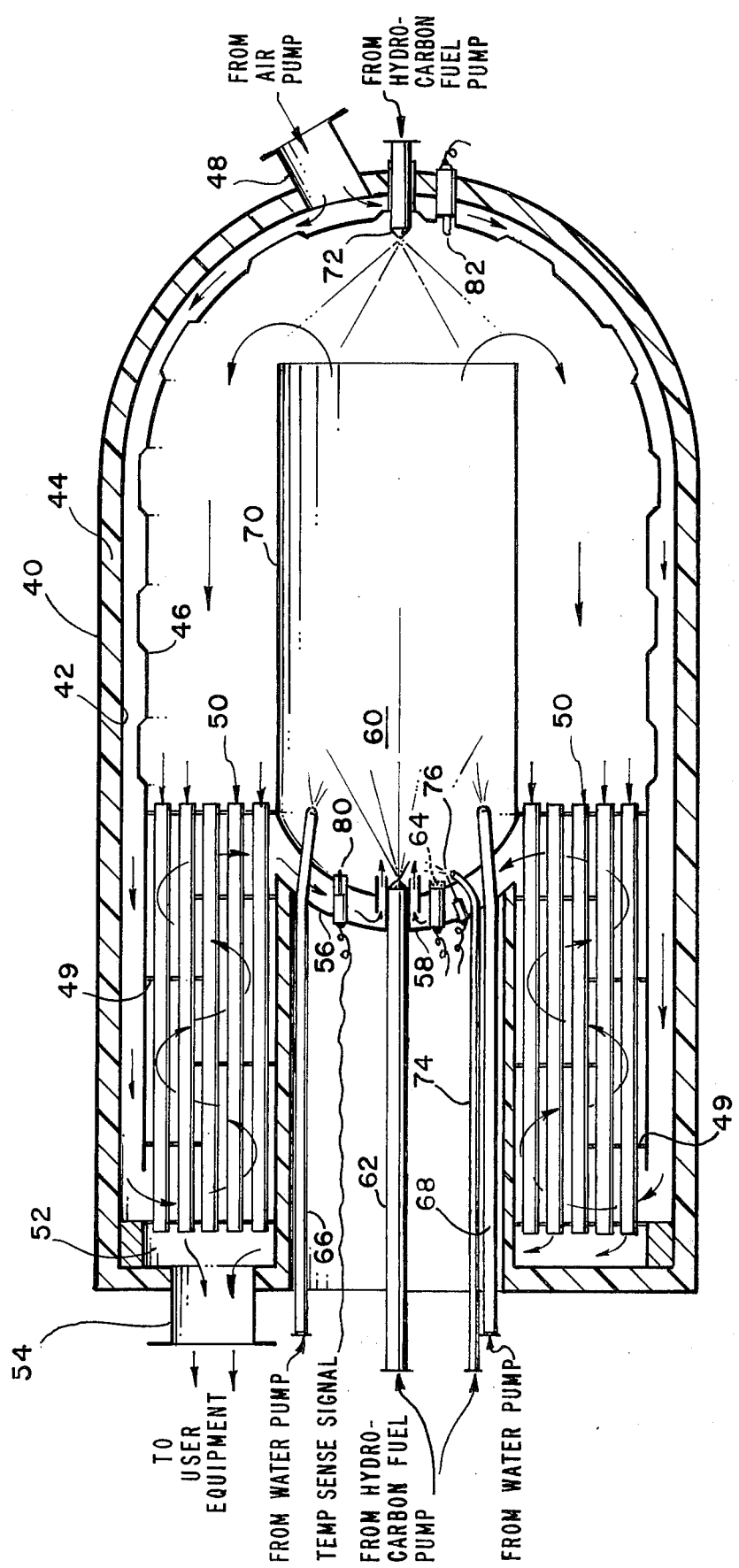
FIG. 2 is a cross-sectional view of a hydrogen generator in accordance with this invention.

FIG. 2 is a sectional view of a hydrogen generator in accordance with this invention. A bell-shaped wall 40 encloses the hydrogen generator. There is an inner wall 42, spaced from the outer bell-shaped wall 40, and therebetween, there is placed thermal insulation material 44. Spaced from the inner wall 42, to define an air passageway therebetween, is another wall 46.

Air, from compressor 36 under pressure, is fed to an inlet 48, which directs the air through an opening in the walls into the passageway between the walls 42 and 46. The wall 46 surrounds the hot region of the hydrogen generator and therefore, serves to preheat the air flowing through the passageway. The air is further preheated in passing between a set of baffles 49 which control the air flow around tubes 50. The tubes 50 conduct the product gas from the reactor region of the hydrogen generator to an accumulator space 52, and thence to an exit flange 54.

After passing through the heat exchanger presented by baffles 49 and the tubes 50, the heated air is conducted by a passageway 56, 58, into a partial oxidation region 60.

A tube 62, terminates in a nozzle through which a spray of liquid hydrocarbon is emitted into the partial oxidation region 60. There, it mixes with air entering from the passageway 56, 58 to provide a fuel rich mixture. The entrance passageways placement and the velocity of the air and the fuel are such as to create a vortex so that excellent mixing takes place. The mixture is ignited by a hot wire or spark igniter 64. The relative quantities of air and fuel provided are such that only partial oxidation of the hydrocarbon takes place but sufficient air is provided so that carbon formation is avoided. Combustion thus takes place under fuel rich conditions, so that very little nitric oxide is produced. In view of the manner of introduction of the fuel and air, a vortex-type flame is provided with a high degree of turbulence, which aids in mixing the air and the fuel and which promotes flame stabilization.

Water spray tubes 66, 68, are provided to inject water spray mist into the hot combustion gases produced by the burning of the hyrocarbon fuel. The water spray mist is vaporized by the gases to produce steam, which then mixes with the hot partial oxidation gases to yield a uniform hot gas at the end of the combustion zone which is defined by the walls 70. These walls are in the form of an open cylinder.

A second spray of liquid hydrocarbon is introduced into the region at the end of the combustion zone by a spray nozzle 72. The hydrocarbon droplets introduced by the second spray nozzle vaporize rapidly and a steam reforming reaction then takes place within the reactor space formed between the walls 70 and 46. As an example, the reaction which occurs is in accordance with the following formulas:

$$C_8H_{18} + 8H_2O \rightarrow 8CO + 17H_2$$

$$C_8H_{18} + 16H_2O \rightarrow 8CO_2 + 25H_2$$

$$CO + H_2O \rightarrow CO_2 + H_2$$

The first reaction represents the major one, the last two reactions are of lesser importance. The spray nozzle 72 must be carefully selected to provide the correct cone angle and spray penetration to insure a uniform mixture of hot gas and vaporized hydrocarbon in the reactor annulus for optimum reaction without soot formation.

Should it be desired to speed up the steam reforming action, a catalyst can be placed in the reaction space. This will be particularly effective when the fuel contains no materials like lead or sulfur that would poison the catalyst.

The resulting hot product gas flows through the tubes 50 and is partially cooled since these tubes constitute a heat exchanger whereby the incoming air takes on the heat of the hot product gas. The tubes 50 terminate in the collecting annulus space 52 and then thereafter are discharged through the flange 54. The product gas will still be superheated with respect to water upon leaving the reactor. If it is desired, the product gas may be further cooled down to condense out the water for recirculation back to the water feed tank. Also if desired, the air stream may be further preheated by using it to cool the cylinder block of the engine or by heat exchange with exhaust gases from the engine.

For start-up purposes, a tube 74 connected to the gas pump 28 is used to spray a small quantity of hydrocarbon fuel onto a hot wire device 76. Specifically, the tube 74 terminates in a nozzle which is adjacent a hot wire 76 which is surrounded by a wire mesh wick (not shown). A small amount of fuel is deposited on this wire mesh wick when it is desired to start the hydrogen generator. Fuel is then ignited and when a temperature sensor 80, which may be any of the well known temperature sensing devices, such as a thermistor, a photocell, or a bi-metallic device, indicates a high enough temperature is reached, then the main supply of hydrocarbon fuel from pipe 62 is enabled to take place.

After the starting flame has been created by the hot wire device 76 and the primary hydrocarbon fuel supply has commenced, and the emission from the spray nozzle 74 has been ignited, a second temperature sensor 82 comes into use. This temperature sensor is provided to indicate when the main flame, due to the burning of the hydrocarbon supplied through the nozzle 62 has heated up the combustion chamber walls to a sufficient degree so that the gas temperature at the sensor 82 reaches a set value. When this temperature sensor provides an output signal indicative of this fact, then the water nozzles 66, 68, can commence the supply of water.

Figure 3:
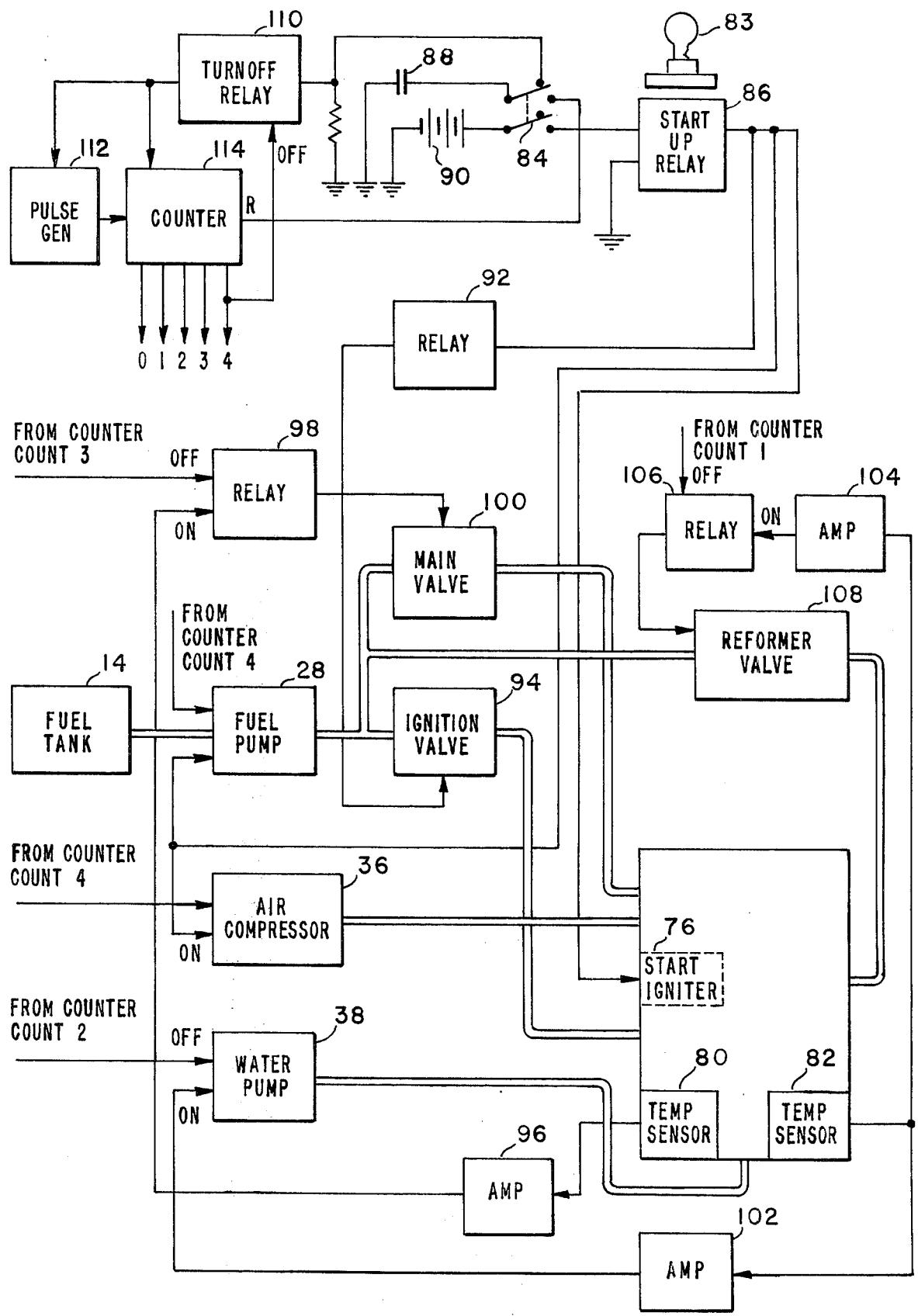
FIG. 3 is a schematic illustration of a control system for a hydrogen generator in accordance with this invention.

FIG. 3 is a schematic drawing of a control arrangement for the hydrogen generator shown in FIG. 2. Upon turning the ignition key 83 for the vehicle, a double pole double throw switch 84, (shown in the open position), is operated. This energizes a start up relay 86, and charges a capacitor 88 from a power source 90. The start up relay enables current to flow to activate the hot wire igniter 76, and also enables the start up of the fuel pump 28, which draws fuel from the tank 14. Also, enabled to be started at this time is the air compressor 36. The start up relay 86 also enables a relay 92 to be operated. This relay energizes ignition fuel valve 94 for a short time whereby a small quantity of hydrocarbon fuel is applied to the wick surrounding the hot wire igniter 76.

The temperature sensor 80 provides an output signal when it senses that a flame is present, which output signal is amplified by an amplifier 96. The output of amplifier 96 energizes a relay 98, which enables the main hydrocarbon fuel solenoid valve 100 to be opened.

Thereafter, when temperature sensor 82 senses that the main flame has heated up the chamber to a sufficient degree, its output is applied to an amplifier 102, whose output enables the water pump 38 to be turned on. Another amplifier 104, also amplifies the output of the temperature sensor 82 and turns a relay 106 on. Relay 106 after a short delay enables a valve 108 to be turned on, which enables hydrocarbon fuel to flow through the nozzle 72 into the reforming region.

The turn on sequence enables a mixture of partial oxidation combustion gas and steam to be established first before the reformer-hydrocarbon stream is started. In addition, the reactor wall surface 70, as a result is thoroughly heated up before the major reformer-hydrocarbon stream is introduced. By this procedure, soot formation is avoided. The whole starting sequence occurs within a few seconds.

When it is desired to shut down, the start-up sequence is essentially repeated in reverse. When the ignition key 83 is turned off, the double pole double throw switch 84 is operated to the position shown. Capacitor 88 enables a turn off relay 110 to be operated over as long an interval as is required for turn off. This relay enables a pulse generator 112 to start generating pulses. These pulses are applied to a counter 114, which in response to them commences to count up. On the occurrence of the first count, relay 106 is enabled to be de-energized and the reformer valve 108 is closed. However, a hot stream of gas will still flow through the whole reactor to promote gassification of any tars or soot that may be deposited.

On the second count, the water pump 38 is turned off. On the third count, the relay 98 is deactivated whereupon the main fuel valve 100 is turned off. If desired, the turn off may be made to proceed in two steps, that is, when the relay 98 receives a turn-off signal, instead of turning off the main valve 100 completely, it may turn it down only partially for a few seconds so that a small air-rich flame will be present in the combuster space within the hydrogen reactor. Air-rich hot combustion gases will then sweep through the whole unit for a few seconds to insure combination of any deposits of tar or soot with the available excess oxygen.

The main valve 100 is then turned off completely. Upon the fourth count, the fuel pump is turned off, as well as the air compressor, relay 110 is turned off resulting in the pulse generator being turned off. It should be noted that upon actuation of the ignition start key, the counter 114 is reset.

Figure 4:
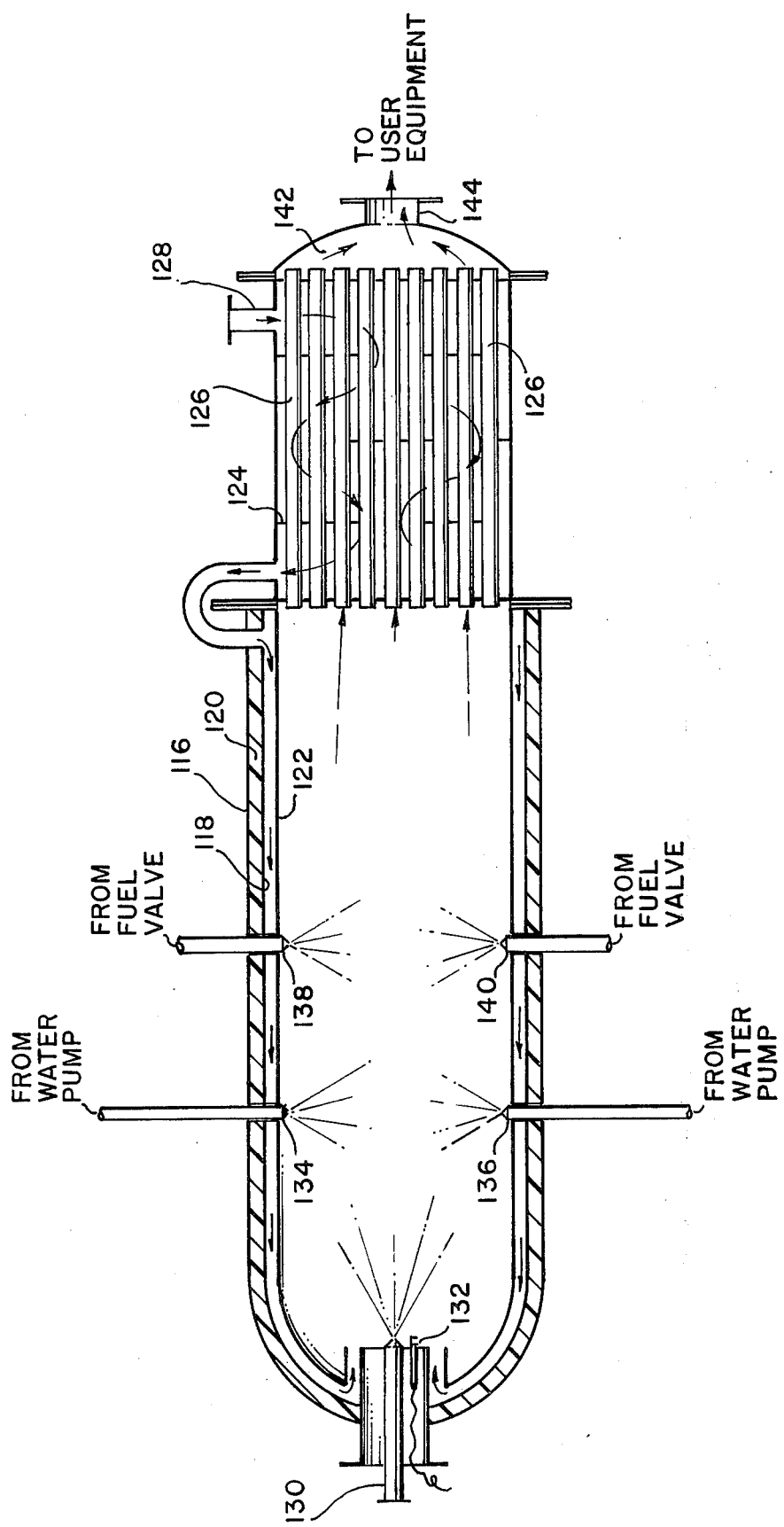
FIG. 4 is another embodiment of a hydrogen generator in accordance with this invention.

FIG. 4 shows another embodiment of a hydrogen generator in accordance with this invention which has a different ratio of length to diameter, but basically operates along the same principles. Namely first, creating a partial oxidation flame region, which is used to vaporize water into steam, which is then used to reform a hydrocarbon. As before, the reactor vessel has an outer wall 116, and an inner wall 118, spaced therefrom, between which there is a thermal insulating material, 120. A third wall 122 is spaced from the inner wall 118 to provide a passageway through which air can pass after it is pre-heated by passing through a heat exchanger provided by an arrangement of baffles 124 and tubes 126. Air is pumped into the shell-side of the heat exchanger through a flange 128. The air is further pre-heated by passing through the annulus formed between spaced walls 118, 122. The air is emitted into the reaction chamber on both sides of a nozzle 130, through which the hydrocarbon fuel is injected as a spray. An igniter 132 is used to ignite the air-hydrocarbon mixture to provide a partial oxidation flame in the region into which the air and hydrocarbon fuel are emitted.

The partial oxidation flame established by the ignited hydrocarbon air mixture provides hot combustion gases into which water spray mists are injected through nozzles respectively 134, 136. The water is vaporized into steam by the hot combustion gases. The hydrocarbon is injected into the resulting gas through nozzles respectively 138, 140. A reforming reaction then takes place in the region downstream of the nozzles 138 and 140 which results in the production of the hydrogen rich gas. This gas then passes through the tubes 126 of the heat exchanger to be cooled by the incoming air flow. A product gas accumulates in an end zone 142 and is discharged through the flange 144 from whence it passes to the engine fuel pneumatic atomizer.

Arrangements for starting and controlling this embodiment of the invention, in connection with an internal combustion engine, are the same as indicated in connection with FIG. 3. Obviously, if a start up for the purpose of generating a hydrogen rich gas for an automobile engine is not required the start up and turn off procedure need not be so elaborate.

Figure 5:
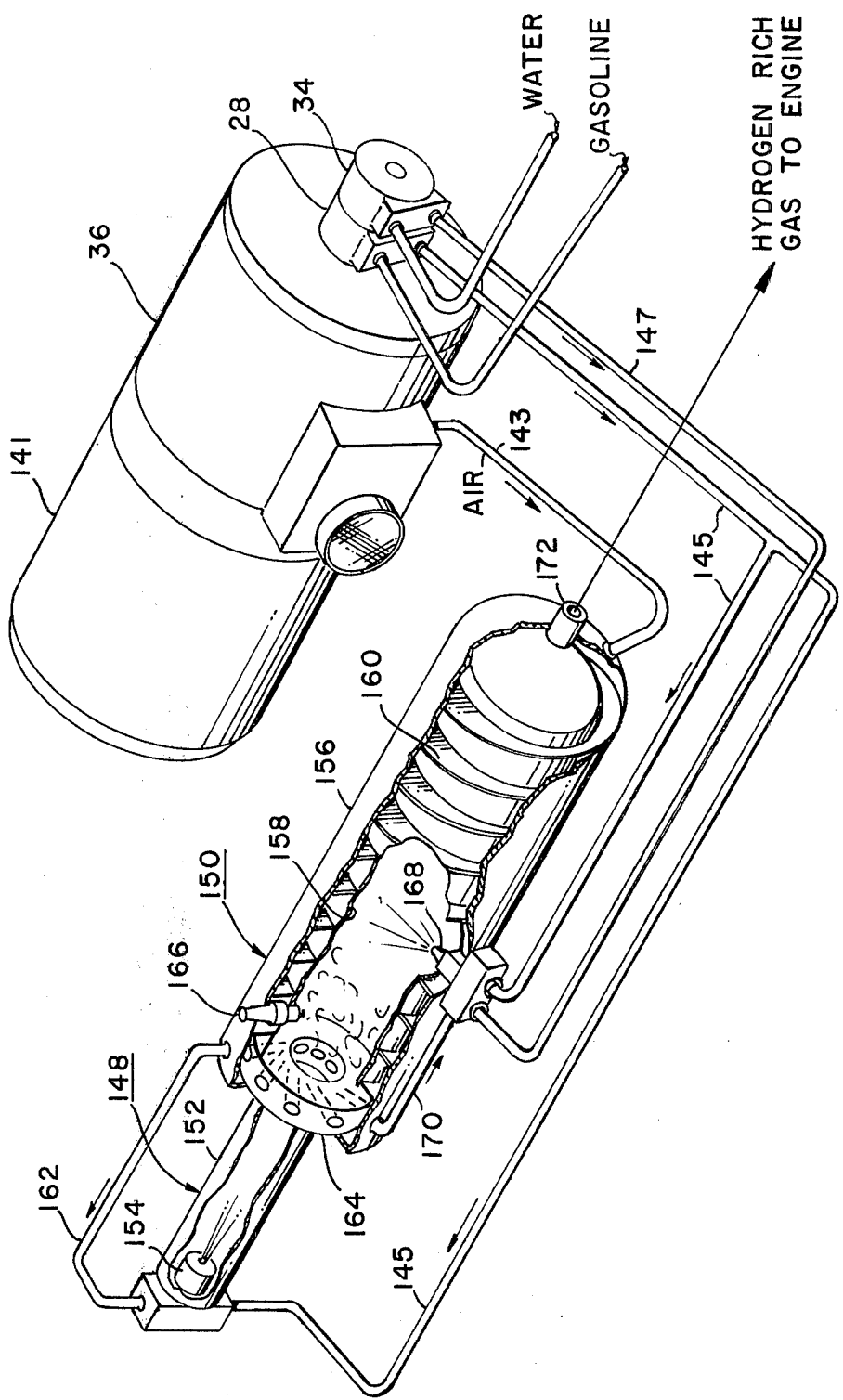
FIG. 5 is yet another embodiment of a hydrogen generator in accordance with this invention.

FIG. 5 is a drawing, in section, illustrating another embodiment of a hydrogen rich gas generator. An electric motor 141 drives an air pump 36, a gasoline pump 28 and a water pump 34 to provide these fluids to the gas generator over the respective pipes 143, 145 and 147. The hydrogen rich gas generator includes two portions respectively 148 and 150 which includes chambers which have the same axis and communicate at one end with each other.

The first portion has cylindrical walls 152 which encloses a first chamber. At one end of this chamber is a pneumatic atomizer 154, to which air, as the operating fluid, and the hydrocarbon fuel are supplied to atomize the fuel.

The second portion 150 of the hydrogen generator has outer cylindrical walls 156. These enclose inner cylindrical walls, 158, which are spaced therefrom and define a second chamber, which is the burning chamber. Between the first and second walls is a spiral wall 160, which defines a spiral passage. Air is pumped into one end of the spiral passage over the pipe 143, to be directed around the inner walls 158 and thus, is preheated by the inner chamber walls which surround the burning chamber. Some of the preheated air is directed over a pipe 162 to the pneumatic atomizer 154.

The fuel-air mixture created in the first chamber is passed into the second chamber through an air swirler 164. This comprises a toroid with a plurality of passages which are angularly directed from the outer periphery of the toroid ring to the central opening. Preheated air from the spiral passage passes through these angularly directed openings and causes the air-fuel mixture passing through the central opening of the air swirler 164 to be swirled as it enters into the burning chamber. A spark plug 166 or other suitable igniting means ignites this mixture and the hot gases which are created pass further into the chamber into which there is sprayed a mixture of gasoline and water through a second pneumatic atomizer 168.

The gasoline and water are supplied to the pneumatic atomizer over pipes 145 and 147. Preheated air is also provided as the atomizer working fluid over a pipe 170.

The hot gases in the second chamber convert the water spray in the fuel-water mixture into steam. The fuel is vaporized and a steam reforming action takes place within the reactor space formed by the burner chamber. Hydrogen rich gas passes out of the opening 172 to the equipment which is going to use it.

For start up, the vehicle ignition switch will also energize the motor 141 which causes delivery of air to the hydrogen generator. After a suitable delay interval to allow air pressure to build up to a predetermined value, such as 5 psig, or when the pressure is sensed by a pressure sensitive switch, (not shown) the engine cranking system is activated, the engine and hydrogen generator ignition systems are activated and a magnetic clutch that couples the water and fuel pumps, respectively 34, 28, to the motor drive are activated. This produces hydrogen substantially instantaneously and the engine then bootstraps itself to the idle condition.

While the hydrogen generator embodiments of the invention have been described in connection with a spark ignition internal engine, which uses a liquid hydrocarbon, called gasoline, this is not to be construed as a limitation on the invention since it will operate with other liquid hydrocarbons, such as diesel oil, or jet fuel to produce a hydrogen rich gas. Also, the hydrogen generator may be used with other types of combustion engines such as diesel or jet, or gas turbines in stationary or automotive applications. This invention, by reason of using a partial oxidation process for generating the energy required for the steam reforming reaction, eliminates the complicated structure required previously wherein the energy for a steam reforming step is supplied from the combustion gases from a separate burner by heat transfer through a heat exchange surface to the high temperature steam reformer gas.

There has therefore been described herein a novel and useful hydrogen rich gas generator.

What is claimed is:

1. A hydrogen rich gas generator comprising
means for defining a source of air,
means for defining a source of hydrocarbon fuel,
means for defining a source of water,
walls defining a closed chamber,
means located within said chamber for mixing a hydrocarbon fuel from said means defining a source of hydrocarbon fuel with a less than stoichiometric quantity of air from said means defining a source of air, to provide an air fuel mixture and for directing said mixture into an adjacent region of said chamber designated as a combustion zone,
means adjacent to said means for mixing for igniting said air-fuel mixture to form hot gases which expand within said chamber,
means within said chamber for preheating air from said means defining a source of air and applying said preheated air to said means for mixing,
means for forming water from said means defining a source of water into a spray mist,
means for injecting said spray mist directly into said hot gases at a location within said chamber adjacent to said combustion zone to form steam and for directly injecting hydrocarbon fuel from said source of hydrocarbon fuel into said hot gases to be steam reformed by said hot gases and steam into a hydrogen rich gas, said location in said chamber into which said spray mist is injected being designated as a steam reforming zone,
means for applying water from said means defining a source of water to said means for forming a spray mist, and
means for conducting said hydrogen rich gas to a collection area.

2. A hydrogen rich gas generator as recited in claim 1 wherein there is included a means for preheating air including means for directing the air sprayed into said combustion zone around said chamber walls enclosing a combustion zone followed by a steam generating zone followed by a steam reforming zone prior to its being applied to said means for mixing.

3. A hydrogen rich gas generator as recited in claim 1 wherein said means for mixing hydrocarbon fuel with a less than stoichiometric quantity of air includes a first pneumatic atomizer means for mixing hydrocarbon fuel and air, and
air swirling means for swirling said mixture of hydrocarbon fuel and air with more air;
said means for injecting said water spray mist into said hot gases to form steam and for injecting a hydrocarbon fuel to be steam reformed by said hot gases includes a second pneumatic atomizer means for mixing water and hydrocarbon fuel into a spray mist.

4. A hydrogen rich gas generator as recited in claim 1 wherein said means for conducting said hydrogen rich gas to a collection area includes a plurality of pipes spaced from one another, said plurality of pipes being positioned within said walls and adjacent to said steam reforming zone; and
said means for preheating air includes means for circulating the air to be sprayed into said combustion zone around said pipes for cooling said hydrogen rich gas and for being preheated prior to being sprayed into said combustion zone.

5. A hydrogen rich gas generator as recited in claim 4, wherein said means for providing a mixture of a hydrocarbon fuel with a less than stoichiometric quantity of air includes pneumatic atomizer means for mixing air and hydrocarbon fuel and directing the mixture at said combustion zone,
air swirling means for causing said mixture to become turbulent;
said means for injecting water spray into said steam reforming zone and said means for injecting hydrocarbon fuel into said steam reforming zone includes a pneumatic atomizer means for mixing water and hydrocarbon fuel and injecting the mixture into said steam reforming zone.

6. A hydrogen rich gas generator comprising:
a hollow container,
means for defining a source of air,
means for defining a source of water,
means for defining a source of hydrocarbon fuel,
means within said container for mixing a hydrocarbon fuel from said means defining a source of fuel with a less than stoichiometric quantity of air from said means defining a source of air and for directing said mixture into an adjacent region within said container designated as a combustion zone,
means for igniting said mixture of hydrocarbon fuel and air in said combustion zone to form hot gases which pass to an adjacent region within said container designated as a steam forming zone,
means for forming a water spray from water from said means defining a source of water, and for injecting said water spray directly into said steam forming zone to be formed into steam mixed with said hot gases which passes to an adjacent region within said container designated as a steam reforming zone,
means for injecting hydrocarbon fuel from said means defining a source of fuel into said reforming zone which is reformed by said steam and hot gases to produce a hydrogen rich gas,
means in said container arranged for conducting said hydrogen rich gas to a collection area, and
means for directing air destined for introduction into said combustion zone around said combustion zone for preheating said air.

7. A hydrogen generator comprising:
a hollow chamber having a thermally insulated wall, another wall inside said chamber spaced from and paralleling said thermally insulated wall to define an air passageway therewith, means for introducing air under pressure into one end of said air passageway which is adjacent to one end of said chamber, said other end of said air passageway opening into the other end of said chamber to emit air under pressure thereinto, means defining a source of a hydrocarbon fuel, means for introducing a hydrocarbon fuel from said means defining a source of hydrocarbon fuel into said other end of said chamber adjacent said location at which said air under pressure is emitted from said air passageway to form a mixture therewith, means for igniting said mixture for producing a hot combustion gas which moves away from said other end of said chamber, means defining a source of water, means connected to said means defining a source of water for spraying water droplets into said hot combustion gas in said chamber which is heated by said hot combustion gas and converted to steam, means spaced from said other end of said chamber for introducing a hydrocarbon fuel from said means defining a source of hydrocarbon fuel into said hot combustion gas and steam in said chamber to be acted upon by said steam and hot combustion gas to be converted to hydrogen rich gas which is at a high temperature relative to said ambient temperature, means near said one end of said chamber for cooling said hydrogen rich gas with said air being introduced into said chamber, and means for emitting said hydrogen rich gas from said one end of said chamber.

8. A hydrogen generator as recited in claim 7 wherein there is included:
a plurality of spaced pipes for conducting the hydrogen gas which is produced in said chamber to an exit passageway, and
said means for cooling said hydrogen gas includes means for circulating said air being introduced around said spaced pipes.

9. A hydrogen generator as recited in claim 6 wherein at said end of said other container wherein said mixture of air and hydrocarbon fuel are burned there is included, means for starting including
means for introducing a predetermined amount of hydrocarbon fuel,
means for igniting said predetermined amount of hydrocarbon fuel,
means for sensing the presence of a flame created by said ignited predetermined amount of hydrocarbon fuel and producing an indication thereof, and
means responsive to the indication by said means for sensing for enabling said hydrocarbon fuel to be introduced into said container to become combustion gas.

10. A hydrogen generator as recited in claim 9, wherein there is further included
means in said chamber for sensing the temperature of said steam, and combustion gas,
means responsive to output from said means for sensing exceeding a predetermined temperature for enabling hydrocarbon fuel to be injected after a predetermined time delay into said container to react with the steam and produce a hydrogen rich gas.

11. A system as recited in claim 7 wherein there is further included:
means in said chamber for sensing when the temperature of the hot gases produced by the combustion of said mixture of air and hydrocarbon exceeds a predetermined level for enabling the introduction of water into said hot combustion gases to form steam, followed by the introduction of hydrocarbon fuel into said steam to form said hydrogen rich gas.

12. A hydrogen rich gas generator comprising
means establishing a first chamber having first and second ends and a second chamber having first and second ends,
means connecting the second end of said first chamber to the first end of said second chamber,
first pneumatic atomizer means in the first end of said first chamber for mixing air and a hydrocarbon fuel and emitting them into said first chamber toward said second chamber,
air swirling means for causing turbulence of the mixture of air and hydrocarbon fuel entering into said second chamber from said first chamber,
means for circulating air around said second chamber to be preheated,
means for applying preheated air to said air swirling means to cause said turbulence,
means for igniting said turbulent mixture to generate hot combustion gases, in said second chamber
second pneumatic atomizer means for injecting a water-hydrocarbon fuel mist into said hot combustion gases to form steam followed by hydrogen rich gas, and
means for removing said hydrogen rich gas from the second end of said second chamber.

13. A hydrogen rich gas generator as recited in claim 4 wherein there is enclosed within said chamber, walls defining a hollow cylinder, said cylinder being adjacent to the location at which said hot combustion gases are produced and extending coaxially with said chamber from said combustion zone through said steam reforming zone and being smaller and shorter than the inside of said hollow chamber to leave a space at one end of said chamber and between said cylinder and said chamber walls, whereby hot hydrogen rich gases pass through said cylinder and then between the outside of said cylinder and chamber walls to preheat the air directed into said chamber by said means for directing.

* * * * *